(12) United States Patent
Zhang et al.

(10) Patent No.: US 9,870,843 B2
(45) Date of Patent: Jan. 16, 2018

(54) ELECTRICAL AND THERMAL CONDUCTIVE PASTE COMPOSITION AND METHOD OF REDUCING PERCOLATION THRESHOLD AND ENHANCING PERCOLATING CONDUCTIVITY USING THE SAME

(71) Applicant: The Hong Kong University of Science and Technology, Hong Kong (CN)

(72) Inventors: Xinfeng Zhang, Hong Kong (CN); Matthew Ming-Fai Yuen, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 21 days.

(21) Appl. No.: 15/115,039

(22) PCT Filed: Mar. 10, 2015

(86) PCT No.: PCT/CN2015/073935
§ 371 (c)(1),
(2) Date: Jul. 28, 2016

(87) PCT Pub. No.: WO2015/135463
PCT Pub. Date: Sep. 17, 2015

(65) Prior Publication Data
US 2016/0358687 A1 Dec. 8, 2016

Related U.S. Application Data

(60) Provisional application No. 61/967,125, filed on Mar. 11, 2014.

(51) Int. Cl.
*H01B 1/22* (2006.01)
*C08J 3/21* (2006.01)
(Continued)

(52) U.S. Cl.
CPC ............... *H01B 1/22* (2013.01); *C08J 3/205* (2013.01); *C08J 3/212* (2013.01); *C08K 9/00* (2013.01);
(Continued)

(58) Field of Classification Search
None
See application file for complete search history.

(56) References Cited

U.S. PATENT DOCUMENTS

2004/0016912 A1  1/2004  Bandyopadhyay et al.
2014/0291834 A1* 10/2014  Gandhi .................. H01L 24/81
257/737

FOREIGN PATENT DOCUMENTS

WO     2005/012411 A1     2/2005

OTHER PUBLICATIONS

Form PCT/ISA/210 issued in corresponding international application No. PCT/CN2015/073935 dated Jun. 16, 2015.

* cited by examiner

*Primary Examiner* — Katie L Hammer
(74) *Attorney, Agent, or Firm* — Nath, Goldberg & Meyer; Jerald L. Meyer; Stanley N. Protigal

(57) ABSTRACT

An electrical and thermal conductive paste composition includes a wetting agent that is arranged as a conduction promoter. Further, a method produces an electrical and thermal conductive paste composition by using a wetting agent as a conduction promoter or a conductivity promoter. The electrical and thermal conductivity of a conductive particle-filled polymer composite is enhanced by using the wetting agent. Capillary forces exerted by the wetting agent cause a particle-filled polymeric suspension to percolate at a decreased volume fraction into a highly conductive network and enhance the conductivity of the composite. Through a jamming gelation technique, the percolation threshold in the (Continued)

particle filled polymer composite is lowered to as low as 3 volume percent. As a result, the electrical and thermal conductivity of the composite is maintained at a significantly lower filler volume fraction with a reduction of particle filler content of up to 50 weight percent.

28 Claims, 12 Drawing Sheets

(51) Int. Cl.
    *C09D 5/24*     (2006.01)
    *C09D 5/26*     (2006.01)
    *C09K 5/14*     (2006.01)
    *C08K 9/00*     (2006.01)
    *C08J 3/205*     (2006.01)

(52) U.S. Cl.
    CPC ................. *C09D 5/24* (2013.01); *C09D 5/26* (2013.01); *C09K 5/14* (2013.01); *C08J 2333/12* (2013.01); *C08J 2363/02* (2013.01); *C08J 2383/04* (2013.01)

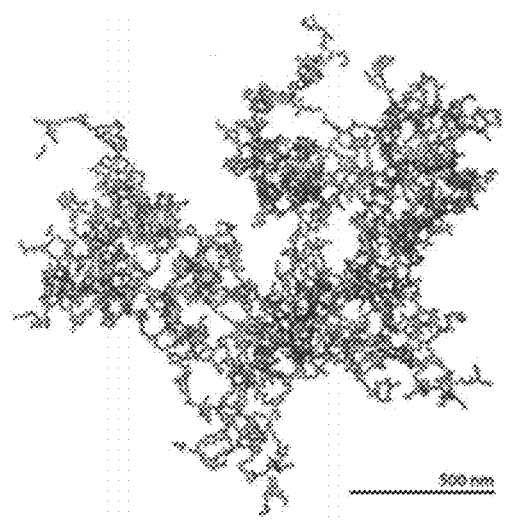
FIG. 1
PRIOR ART
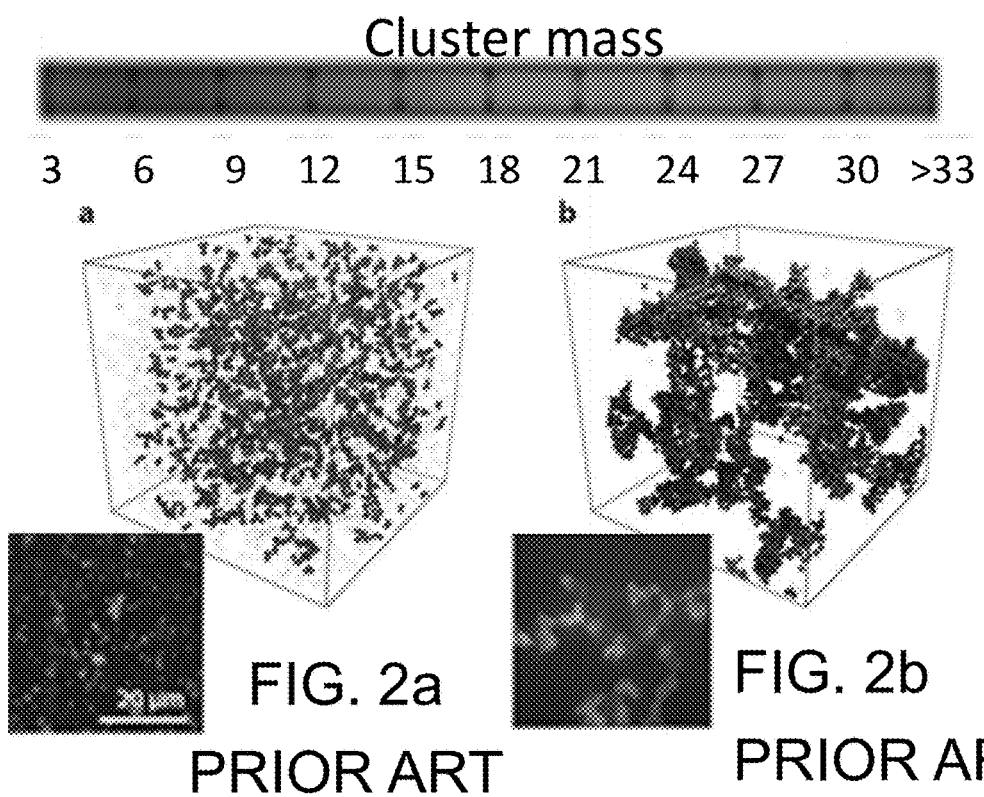
FIG. 2a
PRIOR ART
FIG. 2b
PRIOR ART (d)

(e)

(a)  (b)

US 9,870,843 B2

ELECTRICAL AND THERMAL CONDUCTIVE PASTE COMPOSITION AND METHOD OF REDUCING PERCOLATION THRESHOLD AND ENHANCING PERCOLATING CONDUCTIVITY USING THE SAME

This is a National Phase Application filed under 35 U.S.C. 371 as a national stage of PCT/CN2015/073935, filed Mar. 10, 2015, an application claiming the benefit of U.S. Application No. 61/967,125, filed Mar. 11, 2014, the content of each of which is hereby incorporated by reference in its entirety.

FIELD

The present subject matter relates to an electrical and thermal conductive paste composition including a wetting agent that is used as a conduction promoter or a conductivity promoter, and a method of producing an electrical and thermal conductive polymer composite that has an ultra-low percolation threshold by controlling percolation and improving conductivity.

BACKGROUND

High electrical and thermal conductive polymer composites attract considerable interest in the conductive composite industry due to their wide applications in electronic industries. Examples of high electrical and thermal conductive polymer composites useful in electronic industries include, but are not limited to, die attach materials for thermal management, liquid crystal displays (LCD), surface-mounted assemblies of packaged components on printed wiring board (PWB's), radio frequency identification (RFID) tags, organic light emitting diodes (OLEDs), thin-film photovoltaics (PV), membrane switches, touch panels, printed batteries and sensors, greeting cards, and toys. Typically, these conductive composites contain a polymer matrix filled with conductive fillers. The composite, with a composition beyond a critical volume fraction, transforms from an insulator to a conductor while the conductive fillers form a continuous network. This transformation is known as the connective percolation theory. A disadvantage of using these conventional conductive polymer composites is their relative high resistivity. As a result, many efforts have been dedicated to enhancing the electrical and thermal conductivity of conductive polymer composites, such as through filler selection and modifications.

Conductive silver pastes and inks are widely used in the field of printed electronics and rapid growth in the field continues to promote the consumption of conductive materials. In the past, there have been attempts to lower the percolation threshold and to enhance the conductivity of conductive composites by using long-aspect ratio nanomaterials, such as single-wall nanotubes (SWNT's) and silver nanowires. However, these materials are extremely difficult to handle and incorporate into scalable fabrication, and can only be acquired at a high cost. Consequently, nanomaterials are difficult to commercialize and impractical to use in lowering the percolation threshold and enhancing the conductivity of conductive composites.

As discussed by Peter Lu et al. in *Colloidal particles: crystals, glasses, and gels* (hereinafter, "Colloidal particles") and in *Gelation of particles with short-range attraction* (hereinafter, "Gelation of particles") [Lu, Peter J. et al. Colloidal particles: Crystals, glasses, and gels. Annual Review of Condensed Matter Physics, Vol 4, 4:217-233 (2003)] [Lu, Peter J. et al. Gelation of particles with short-range attraction. Nature 453, 499-503 (2008)], it is well known that colloidal suspension, including small solid particles with sizes ranging between 10 nanometers (nm) and several microns suspended in a fluid and driven by thermal energy, form fractal cluster-like networks during a gelation process. In these fractal clusters, a small number of particles occupy a large volume of space. For example, FIG. 1 shows a typical transmission electron microscope (TEM) image of a cluster jammed from a gold colloidal nanoparticle where the size of the gold nanoparticles is approximately 10 nm, and its cluster size is approximately 1 micrometer (μm).

Furthermore, P. J. Lu et al. in *Gelation of particles* discuss that colloidal particle gelation has been widely investigated in attractive colloidal systems. FIGS. 2a and 2b show 3D confocal microscope images of a standard colloidal suspension consisting of microspheres with a particle size of approximately 1 μm and a particle volume fraction (v %) of 4.5, indicating the formation of a 3D spanning particle network. Additionally, as shown in the inset of FIGS. 2a and 2b are the 2D confocal microscope images of the colloidal particles before and after gelation, which clearly demonstrate a fractal network. The fractal cluster size ranges between approximately 20 μm to 50 μm. Although the fractal cluster size is similar to the size of a jamming percolating network, using a jamming gelation technique to control percolation and decrease the filler content is not considered in prior art.

Furthermore, Fortini et al. investigate in *Clustering and gelation of hard spheres induced by the Pickering effect* [A. Fortini. Clustering and gelation of hard spheres induced by the Pickering effect. Phys. Rev. E 85, 040401(R) (2012)] the gelation of colloidal particles with a volume loading of 10 v % under capillary attraction by Brownian dynamics simulation, as shown in FIGS. 3a-3d. Fortini et al. also reveal the formation of a fractal clustering network by capillary bridging of the colloidal particles. However, Fortini et al. fail to control percolation, decrease the filler content, or use a jamming gelation technique.

SUMMARY

The present subject matter provides an electrical and thermal conductive composite including a base material arranged to form a matrix and mixed with conductive particulate fillers. A conduction promoter is arranged to saturate a filler surface of the base material that is filled with conductive particulate fillers, where the conduction promoter is an immiscible wetting agent with an ultra-low particle filler volume fraction. A mixture of the base material, conductive particulate fillers, and the immiscible wetting agent form a particle-filled polymeric suspension that undergoes capillary forces exerted by the immiscible wetting agent. Due to the capillary forces, capillary bridges are arranged between the conductive particulate fillers. Percolation of the particle-filled polymeric suspension and the presence of capillary bridges form a conductive network that is highly conductive and enhances the conductivity of the composite.

A method for producing an electrical and thermal conductive composite includes mixing a base material with conductive particulate fillers, where the base material forms a matrix. The method further provides saturating a filler surface of the base material that is filled with conductive particulate fillers with a conduction promoter that has an ultra-low particle filler volume fraction. An immiscible wetting agent is used as the conduction promoter and exerts capillary forces upon a particle-filled polymeric suspension. Capillary bridging is then induced between the conductive particulate fillers due to capillary forces, and a conductive network is formed from percolating the particle-filled polymeric suspension and inducing the capillary bridging.

BRIEF DESCRIPTION OF THE DRAWINGS

FIG. 1 depicts a transmission electron micrograph (TEM) of a typical cluster jammed from gold colloidal nanoparticles, in accordance with related prior art.

FIG. 2a depicts a 3D reconstruction and a 2D confocal microscope image for poly(methyl methacrylate) (PMMA) suspension, in accordance with related prior art.

FIG. 2b depicts a reconstruction and confocal image of a gel containing a single spanning cluster, in accordance with related prior art.

FIG. 7b shows an enlarged image depicting the center of the fractal filler network induced by jamming gelation of FIG. 7a.

DETAILED DESCRIPTION

The foregoing and other features and advantages of the electrical and thermal conductive paste composition and method thereof will be apparent from the following description, as illustrated in the accompanying drawings wherein like reference numbers generally indicate identical, functionally similar, and/or structurally similar elements. While specific exemplary embodiments are discussed, it should be understood that this is done for illustrative purposes only. A person skilled in the relevant art will recognize that other components, configurations, and steps can be used without departing from the scope of the subject matter as defined by the claims.

Herein, a breakthrough in electrical and thermal conductive paste composition and a method of producing these conductive pastes is described by using a novel jamming gelation technique. Jamming gelation applies to composites including, but not limited to, silver pastes, silver adhesives, silver inks, electrical conductive pastes and adhesives, thermal conductive pastes and adhesives, thermal conductive pads and sheets, thermal conductive composites, thermal interface materials, and die attach materials. Additionally, jamming gelation is used in the production of elastic and stretchable conductors for wearable electronics and to produce self-curable and self-heatable conductors for soft-robots.

Jamming gelation describes controlling the percolating conductivity of a polymer composite by using a wetting agent, such as a conduction promoter or a conductivity promoter. Due to the capillary force brought by the wetting agent, the particle-filled polymeric suspension is percolated at a decreased volume fraction. The percolation threshold in the particle filled polymer composite is lowered to approximately 3 v %. Furthermore, the electrical and thermal conductivity of the composite is largely enhanced at a much lower filler volume fraction.

The advantages of lowering filler content and enhancing the conductive performance of conductive composites include compatibility with conventional composite manufacturing processes, a generic composite and method of producing a generic composite that is applicable to a broad range of conductive composite materials, and a simple and low-cost composite that does not require complex processing.

Figure 3A:
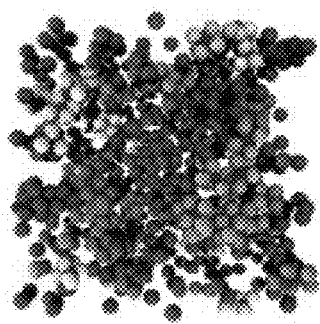
FIG. 3a depicts a simulation of particle aggregation by a 0.63% volume of secondary fluid, in accordance with related prior art.
Figure 3B:
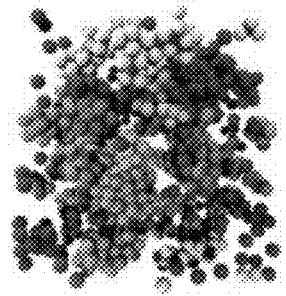
FIG. 3b depicts a simulation of particle aggregation by a 1.05% volume of secondary fluid, in accordance with related prior art.
Figure 3C:
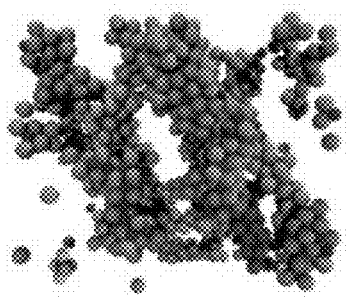
FIG. 3c depicts a simulation of particle aggregation at a percolation point of 1.48% volume of secondary fluid, in accordance with related prior art.
Figure 3D:
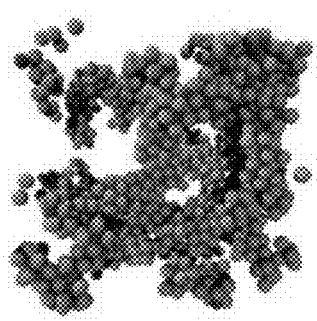
FIG. 3d depicts a simulation of particle aggregation by at a percolated state of 1.9% volume of secondary fluid, in accordance with related prior art.
Figure 4A:
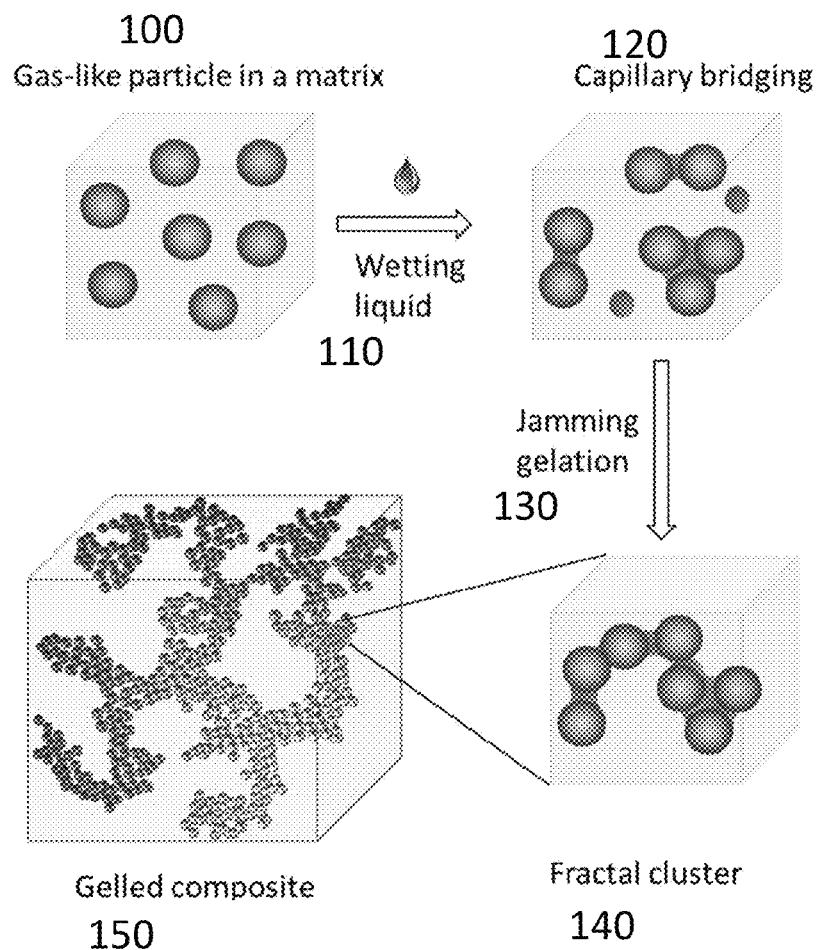
FIG. 4a depicts the tuning percolation of particle filled polymer composites by capillary induced jamming gelation.

Referring to FIG. 4a, a base material forms a matrix where the base material is selected from any number of combination of materials. The base material may be selected from, but is not limited to, polymers, biomacromolecular materials, organic-inorganic sol-gels, metals, metal oxide, ceramics and/or precursors or derivatives of polymers, biomacromolecular materials, organic-inorganic sol-gels, metals, metal oxide, ceramics or combinations thereof. If the base material may be selected from a polymer, the polymer material includes, but is not limited to, polymer solutions or polymer suspensions, thermo-plastics, thermo-setting resins, rubbers, elastomers, polymer gels, hydrogels, organogels, or other types of macromolecular based materials or derivatives of polymer solutions or polymer suspensions, thermoplastics, thermo-setting resins, rubbers, elastomers, polymer gels, hydrogels, organogels, and types of macromolecular based materials.

Still referring to FIG. 4a at 100, the matrix formed by the base material is arranged to mix with gas-like particles or conductive particulate fillers. The mixture of the base material and these conductive particulate fillers form a polymeric suspension. The type of conductive particulate fillers capable of being mixed with the base material include metals, non-metals, metal oxides, and ceramic powders or a derivative form of metals, non-metals, metal oxides, and ceramic powders. The size of the conductive particulate fillers range from tens of a nanometer to a few millimeters and do not necessarily have a specific shape. As a result, the conductive particulate fillers are not limited to being selected from high aspect ratio materials, such as carbon nanotubes.

Additionally, auxiliary components may optionally be mixed with the base material and the conductive particulate fillers. If auxiliary components are used, the components may comprise of any type of liquid or powder. By incorporating auxiliary components, self-assembly of the conductive filler particles into a conductive network is promoted, as the auxiliary components serve as functional additives to the electrical and thermal conductive composite. These auxiliary components include, but are not limited to, organic solvents acting as diluents, pre-polymer compounds acting as thickening agents, inorganic nanoparticles acting as thixotropic agents, curing agents, and catalysts.

Referring back to FIG. 4a, a conduction promoter 110 is used to saturate the surface of the conductive particulate fillers. The type of conduction promoter may be selected from materials including, but not limited to, water, organic compounds, metallorganic compounds, ionic liquids, deep eutectic solvents and mixtures thereof. Further, the conduction promoter can be a liquid-type polymer such as silicone oil, thermosetting resin precursors, or a solution of a dissolved polymer.

Additionally, the conduction promoter may contain additional functional materials selected from a nanoparticle of a metal, metal oxides or ceramics, and carbon-based materials including a carbon tube, graphene, and graphene oxide. The conduction promoter is a precursor and generates immiscible wetting agents during processing or under processing conditions. In particular, a small amount of the immiscible wetting agent is added to the polymer suspension by a weight percentage (wt %) of at least 0.1 to 2 of the polymer matrix or within a range of 0.1 to 20 wt %. The immiscible wetting agent is either in a liquid form or a solid form that melts under the processing conditions, the processing conditions including, but not limited to, temperature, pressure, and mixing conditions. The processing temperature is typically 20° Celsius to 100° Celsius. For some polymer resins with a higher melting point, the processing temperature can be up to 300° Celsius. The pressure is typically 1 standard atmospheric pressure when shear mixing is implemented. Typically shear mixing occurs at 1,000 to 2,000 revolutions per minute (rpm), and the mixing time ranges from a few seconds to several hours. By using another mixing method, such as extrusion, the mixing pressure can be increased, for example, to up to 100 standard atmospheric pressure. Extrusion is only one non-limiting example of a mixing method other than shear mixing.

Still referring to FIG. 4a, the immiscible wetting agent is any inorganic or organic compound that wets the filler surface. The wetting agent can also be arranged to wet the filler surface in the polymer matrix of the base material without wetting the filler surface itself. For example, the wetting agent can be arranged to saturate the filler surface without wetting the filler surface itself by a chemical reaction or dissolution with compositions in the polymer matrix of the base material. By adding the wetting agent to the filler surface and/or the filler surface in the matrix of the base material, the wetting agent treated suspension or polymeric suspension exerts capillary forces upon the suspension. These capillary forces precipitate capillary bridging 120 between the conductive particulate fillers, thereby inducing jamming gelation 130. As shown in FIG. 4a, there is a transition of the dispersed filler suspension from a fluid state to a jammed state of fractal clusters 140 that is induced by the addition of a second immiscible liquid. This transition is triggered by the formation of capillary bridges 110 between the conductive particulate fillers and concomitantly a jamming gelation state 150.

Figure 4B:
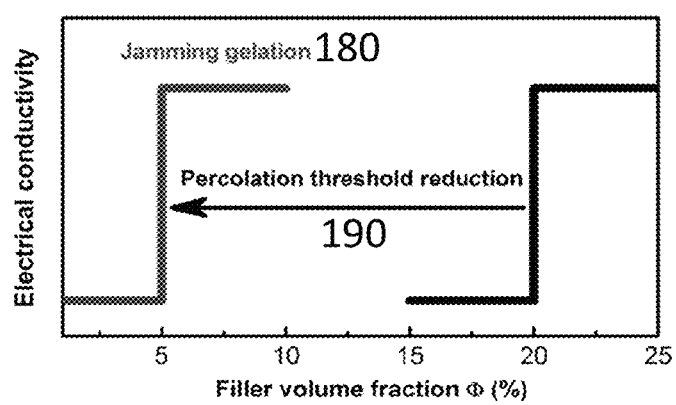
FIG. 4b depicts the jamming gelation percolation threshold ($\Phi c$) of a conductive composite.

Referring to FIG. 4b, demonstrating the electrical conductivity of the electrical and thermal conductive composite versus the filler volume fraction of the composite, the jamming gelation 180 greatly reduces the percolation threshold 190 of the conductive composite. Percolation control is achieved from the formation of the self-assembled filler network, as capillary forces act to bridge filler particles, thereby forming a conductive network. By controlling percolation, a more reliable and controlled conductive network is formed.

Figure 5:
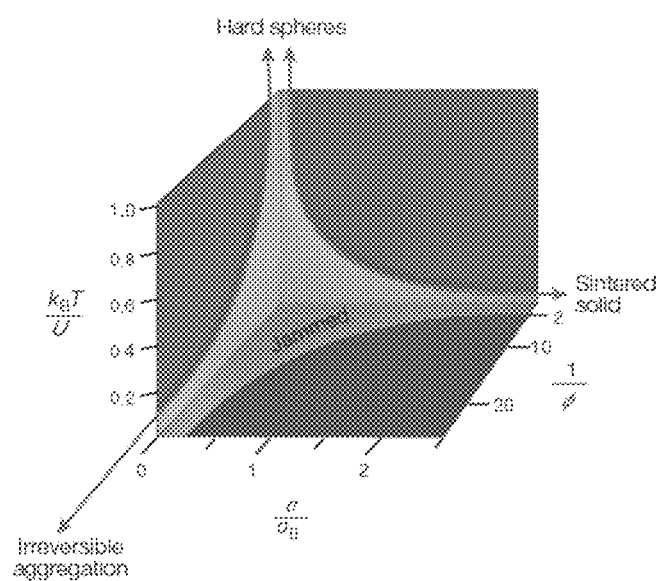
FIG. 5 depicts a jamming phase diagram of a colloidal suspension, in accordance with related prior art.

Referring to FIG. 5, showing an experimental "jamming phase diagram" for a system of colloidal particles, developed by V. Trappe et al. in *Jamming phase diagram for attractive particles* [Trappe, V et al. (14 Jun. 2001). Jamming phase diagram for attractive particles. Nature 411 (6839): 772-775], the percolation of the filler particles is known to be affected by the volume fraction of the filler, the attraction potentials and the applied stress. Based upon the model shown in FIG. 5, the jammed state of colloidal particles is affected by the filler volume (ø), attraction potential (U), and the applied stress (o). As such, electrical and thermal conductive polymer composites or paste compositions using a jamming gelation technique significantly lower the conductive particulate filler volume fraction and percolation threshold.

By involving capillary-induced attraction potentials in the suspensions, as evidenced by FIG. 5 and illustrated in FIGS. 4a and 4b, the particle percolation is controlled by using the wetting agent to form capillary bridges between the filler particles into a conductive network at a much lower volume fraction. Consequently, jamming gelation corresponds to a decrease of the percolation threshold of a conventional particle-filled composite from approximately 20 v % to less than 5 v %, a much lower filler volume fraction.

Figure 6A:
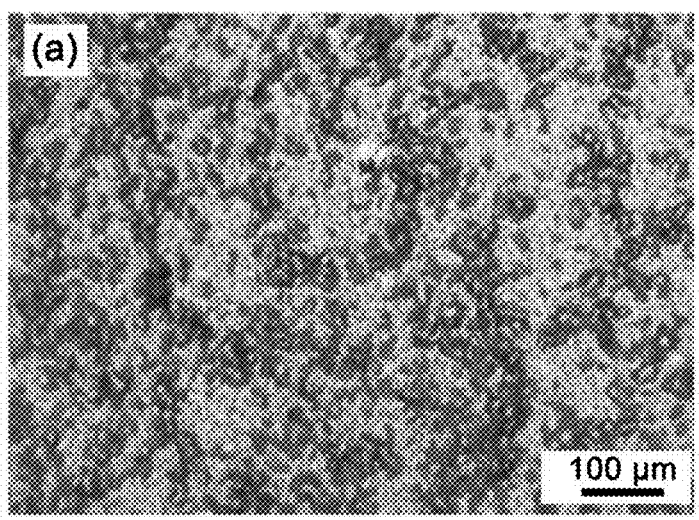
FIG. 6a depicts optical microscopy images of jammed silver-epoxy composites before curing.
Figure 6B:
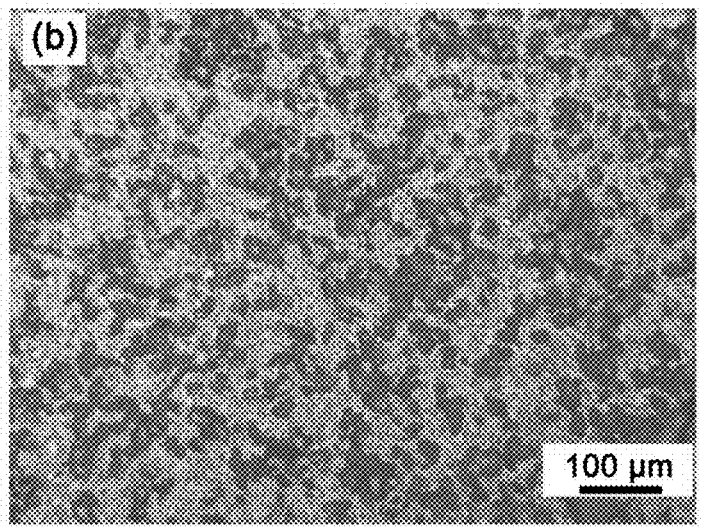
FIG. 6b depicts optical microscopy images of jammed silver-epoxy composites after curing.

Referring to FIGS. 6a and 6b, the microstructures of silver particles jammed by a wetting agent in silicone oil is shown, as these particle networks are reminiscent of the particle networks in colloidal gels. Microscopic images of the silver-epoxy composites before curing, as shown in FIG. 6a, and after curing, as shown in FIG. 6b, demonstrate the jamming effect. More specifically, these optical microscopic images with 3 v % and 25 wt % of silver filled epoxy identify the formation of a fractal clustering network of silver particles. Additionally, the size of the fractal clustering network is approximately 70 µm which is consistent with experimental and simulated results on jammed colloidal suspensions with similar particle loading.

Figure 7A:
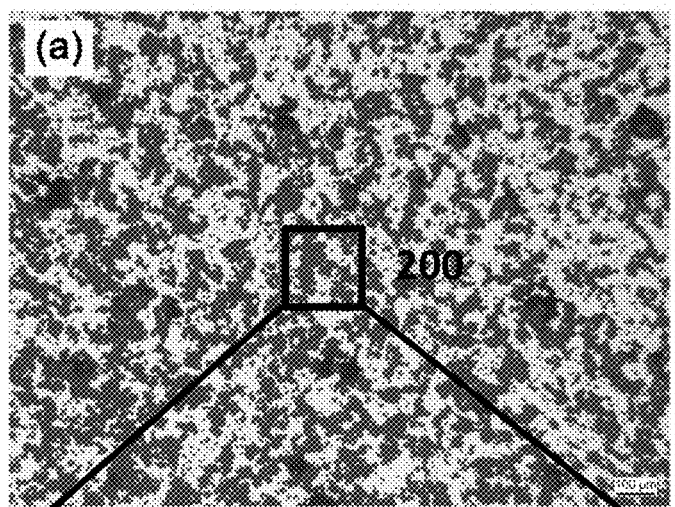
FIG. 7a shows a large-area image depicting the fractal filler network induced by jamming gelation.
Figure 7B:
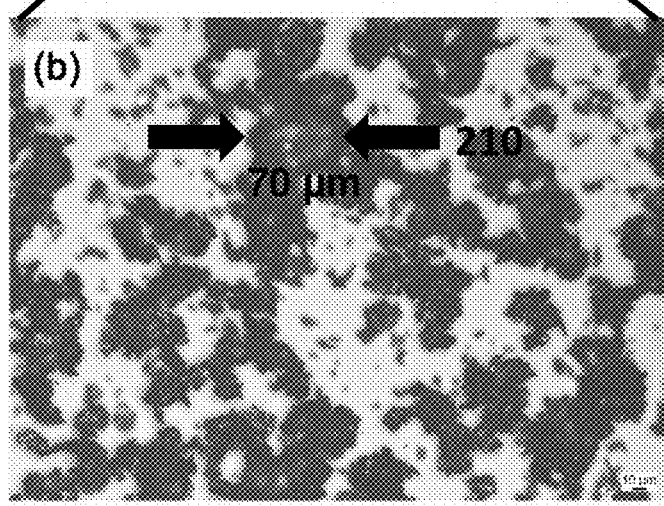

Referring to FIGS. 7a and 7b, the typical optical images of a jammed silver network in silicone oil is shown. The jammed silver network is composed of fractal particle aggregates with branches of approximately $10^2$ μm in size. As shown in FIG. 7a, the fractal-like filler network is induced by jamming gelation and the silver branches are formed from the jamming. As shown in FIG. 7b, an enlarged image taken from the center of the fractal filler network of FIG. 7a further depicts the silver branches sized at approximately $10^2$ μm.

A jammed silver network is merely one of many examples that use the electrical and thermal conductive composite and method of producing the same.

Some additional non-limiting examples include:

Example 1

Preparation of a silicone oil based conductive paste. Typically, a certain amount of silver particles is added to the silicone oil and mixed by a planetary mixer, such as the Thinky Mixer®, A250 type at 2000 rpm for 1 minute. Then, the wetting agent, as described herein, is added and further mixed at 2000 rpm for 30-120 s. These silver-silicone pastes can be used as thermal conductive pastes.

Example 2

Preparation of an epoxy based conductive paste. Typically, the epoxy (2.7 g) is mixed with a hardener (2.3 g) and silver particles with a mixer at 2000 rpm for 8 min. A non-limiting example of the epoxy is diglycidyl ether of Bispheol-A type (DER329) from Shell Chemicals® with an average molecular weight of 377. A non-limiting example of a typical hardener is an anhydride type hardener, such as hexahydro-4-methylphthalic anhydride (HHMPA). Then, a catalyst (25 mg) is added and mixed at 2000 rpm for 1 min. A non-limiting example of a typical catalyst is 2-ethyl-4-methyl-imidazole. Finally, the wetting agent, as described herein, is added and further mixed at 2000 rpm for 1 min. These silver pastes can be used as die attach materials or printed conductive materials for a circuit in printed electronics.

Example 3

Preparation of poly(methyl methacrylate) (PMMA) based conductive paste. Typically, PMMA (0.3 g) is first dissolved in chloro-benzene (1 mL). Then, a certain amount of silver particles are added and mixed with a mixer at 2000 rpm for 1 minute. Finally, the wetting agent, as described herein, is added and further mixed at 2000 rpm for 1 minute. These silver-PMMA pastes can be used as a conductive ink for a printed circuit in printed electronics.

Figures 8A, 8B:
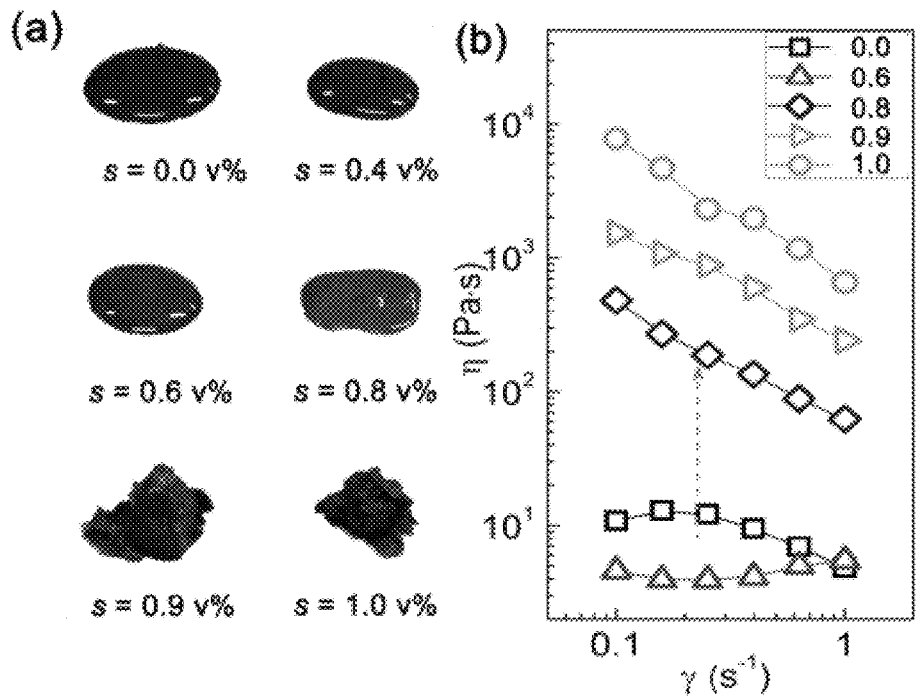
FIG. 8a depicts silicone oil with silver particles ($\Phi=20$ v %) being jammed by different amount of the wetting agent (s).
FIG. 8b depicts a low shear viscosity ($\eta$) of suspension jammed with different amount of the wetting agent (s), as a function of shear rate ($\gamma$).

Referring to FIGS. 8a-8e, the result of the wetting agent treated suspension and the jamming gelation induced by capillary bridging is shown. In FIGS. 8a-8e, microsized samples of silver particle filled silicone oil composites are treated with different amounts of a wetting agent. The capillary bridges formed in the wetting agent treated suspension produce percolating electrical conductivity in the polymer composites at an unprecedented low particle volume fraction. As shown in FIG. 8a, photographs of silicone oil with jammed silver particles of 20 v % are listed with amounts of the wetting agent (s). As a result, a clear transition from a fluid state to a jammed state is observed in the jamming gelled suspension. Using capillary jamming to control the percolation in polymer composites provides some versatility. Still referring to FIG. 8a, both thermosetting and thermoplastic types of a polymer matrix produce a thermosetting polymer based composite. The silver particles of FIG. 8a are thoroughly mixed with an epoxy resin, and 1 v % of a wetting agent is added into the suspension and shear-mixed into the paste. The silver-epoxy paste is painted onto a glass slide and cured at 150° C. for 15 minutes, then the electrical conductivity (σ) of the epoxy filled with different filler volume fractions of silver particles is measured by four-point probe method, as shown in FIG. 8a. As a result, the percolation threshold decreased from approximately 18 v % in the original suspension to approximately 4 v % after the capillary jamming gelation treatment. The electrical conductivity of the jammed silver-epoxy composite with approximately 4 v % silver particle is approximately 10 S/cm, the same conductivity comparted to the unjammed composite with 20 v % of silver filler.

Particularly, as shown in FIG. 8b, an abrupt transition of fluid suspension transitions to a solid-like composite at an ionic liquid content of 0.8 v %. Still referring to FIG. 8b, the jammed suspension created from the wetting agent induced capillary forces is consistent with the increase of the low shear viscosity (η) of the suspension with the wetting agent (s) which sharply increases along with the increase of the wetting agent content, as a function of the shear rate (γ).

Figure 8C:
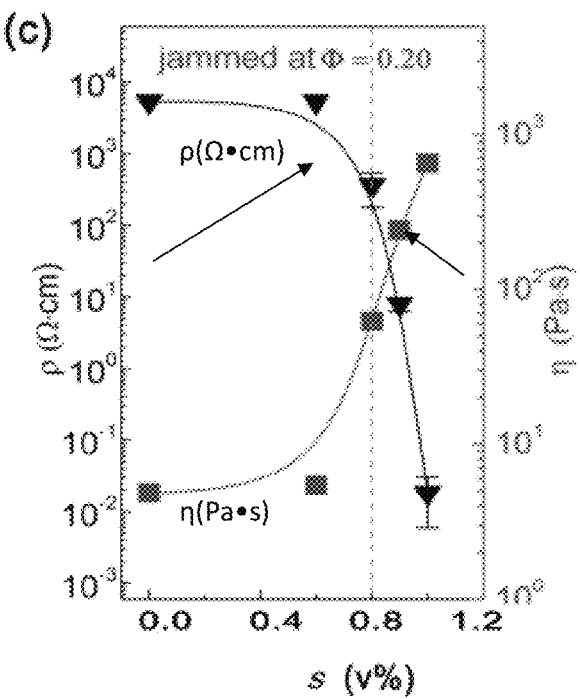
FIG. 8c depicts the electrical resistivity ($\rho$) and $\eta$ (at $\gamma=1$ s$^{-1}$) of the 20 v % silver particle filled silicone oil as a function of the wetting agent (s).

Referring to FIG. 8c, the electrical conductivity of the composite is plotted together with viscosity evolutions. In particular, the electrical resistivity (ρ) and the viscosity (η) at γ=1 s$^{-1}$ of 20 v % silver particle filled silicone oil is plotted, as a function of the wetting agent (s). The electrical conductivity of the composites increase along with the increase of the wetting agent content, which behaves as a percolation transition thereby exhibiting the jamming gelation technique.

Figure 8D:
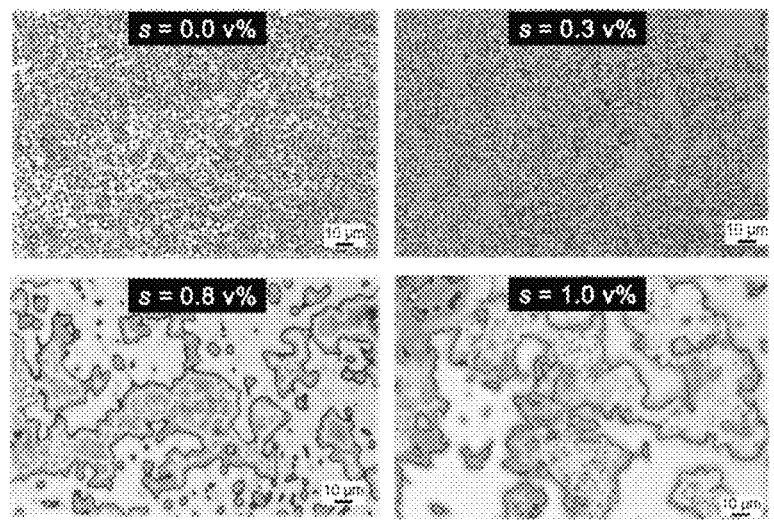
FIG. 8d depicts optical microscopy images of a 3 v % silver particle filled silicone oil with different amounts of the wetting agent (s).
Figure 8E:
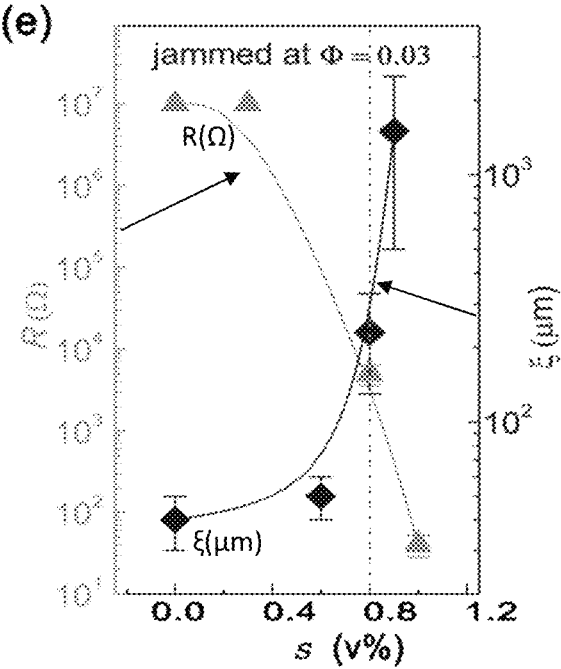
FIG. 8e depicts the electrical resistance (R) and the largest cluster size ($\xi$) of the 3 v % silver particle filled silicone oil as a function of the wetting agent (s).

Referring to FIG. 8d, the electrical resistance (R) and the largest cluster size (ξ) of the 3 v % silver particle filled silicone oil is shown, as a function of the wetting agent (s). The optical microscopic images of the 3 v % silver filled silicone oil with different amounts of the wetting agent, s=0.0 v %, 0.003 v %, 0.008 v % and 0.01 v %, respectively, is also shown. After using a small amount of the wetting agent s=0.003 v %, only some elongated and branched filler agglomerations form due to the lack of enough wetting liquid to form pendular bridges. With a further increase of s to 0.008 v % and 0.01 v %, the branched agglomerations gradually interconnect into a three-dimensional spanning network with a branch size of approximately 100 μm. Furthermore, the potential of jamming gelation in inducing electrical percolation is shown when the filler loading is decreased to 3 v %. As shown in FIG. 8e, a two-probe method tests the electrical resistance (R) of the suspension and monitors the electrical percolation of the jamming suspension. FIG. 8e shows that a similar percolation-type change in R, with a sharp drop of R at s=0.8 v % occurs. As shown by the dashed line in FIG. 8e, again the electrical percolation fits well with the jamming gelation transition. The determination of the largest cluster size (ξ) as a function of the wetting agent (s) and a direct correlation between the network structures with electrical percolation is also shown. Still referring to FIG. 8e, the results show that the percolation threshold of the suspension is greatly reduced by implementing jamming gelation due to the formation of the interconnected filler network. Furthermore, the ultra-low jamming gelation threshold achieved by the attractive capillary bridge forces leads to the ultra-low percolation threshold in the conductive composite. The ultra-low percolation threshold is less than 5 v % and preferably as low as 3 v % or 0.03 volume fraction compared to a higher percolation threshold of conventional particle-filled composites.

The properties and reliability of the composite produced from using jamming gelation is improved by selecting the appropriate type of wetting agent based on the application of the composite. In particular, in some cases, using an unsuitable wetting agent as the conduction promoter can result in deteriorating the composite. In jamming gelation, an immiscible wetting agent in liquid or solid form is selected. If a wetting agent in solid form is selected, then the solid will melt under processing conditions. These processing conditions include, but are not limited to, temperature, pressure, and mixing conditions. The processing temperature is typically 20° Celsius to 100° Celsius. For some polymer resins with a higher melting point, the processing temperature can be up to 300° Celsius. The pressure is typically 1 standard atmospheric pressure when shear mixing is implemented. Typically shear mixing occurs at 1,000 to 2,000 revolutions per minute (rpm), and the mixing time ranges from a few seconds to several hours. By using another mixing method, such as extrusion, the mixing pressure can be increased, for example, to up to 100 standard atmospheric pressure. Extrusion is only one non-limiting example of a mixing method other than shear mixing.

Regarding selecting the wetting agent, the wetting agent is an inorganic or an organic compound that wets the filler surface. The wetting agent can also be arranged to wet the filler surface in the matrix of the base material. Typically, 2 v % to 5 v % of the wetting agent is enough to saturate the filler surface. However, the amount of the wetting agent needed to saturate the filler surface depends on the particle size and the surface area. When the filler surface is saturated with the wetting agent in the matrix of the base material, the viscosity of the composite will not increase with an increase in the amount of the wetting agent. Additionally, the electrical and thermal conductivity of the composite will not increase with an increase in the amount of the wetting agent.

Figure 9:
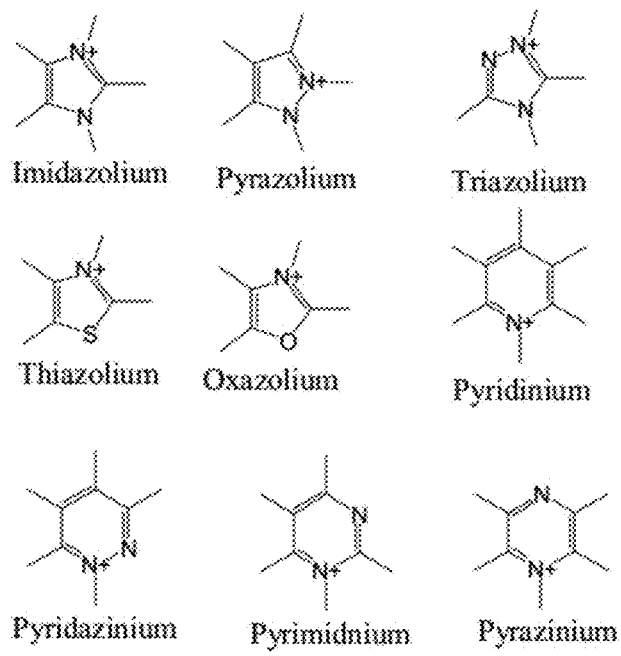
FIG. 9 depicts typical Molecular structures of cations of ionic liquids used as jamming agents.

Generally, the wetting agent used for jamming percolation can include a broad range of ionic liquids, which can be described by the general formula:

where $Cat^+$ is, in principle, any of ammonium, phosphonium, sulfonium, imidazolium, pyrazolium, triazolium, thiazolium, oxazolium, pyridinium, pyridazinium, pyrimidnium, pyrazinium cation, and X is a Lewis base, generally a halide anion including, but not limited to, fluoride ($F^-$), chloride ($Cl^-$), bromide ($Br^-$), and iodide ($I^-$). FIG. 9 lists typical molecular structures of cations of the ionic liquids that are used as jamming agents.

A special class of ionic liquid, also called a deep eutectic solvent (DES) is widely used as jamming agents for a broad range of jammed particle-polymer composites. DES's can be described by the general formula:

where $Cat^+$ is in principle any ammonium, phosphonium, sulfonium, imidazolium, pyrazolium, triazolium, thiazolium, oxazolium, pyridinium, pyridazinium, pyrimidnium, pyrazinium cation, and $X^-$ is a Lewis base, generally a halide anion including, but not limited to, fluoride ($F^-$), chloride ($Cl^-$), bromide ($Br^-$), and iodide ($I^-$). A complex anionic species is formed between $X^-$ and either a Lewis or Brønsted acid Y (z refers to the number of Y molecules that interacts with the anion), where Y is classified into 4 groups:

Type I: Y is a non-hydrated metal halide, MXn, where M is a metal ion including, but not limited to, iron (Fe), cobalt (Co), nickel (Ni), copper (Cu), zinc (Zn), lithium (Li), sodium (Na), potassium (K), silver (Ag), cadmium (Cd), tin (Sn), aluminum (Al), gallium (Ga), indium (In), and other transition metals or rare earth metal ions); X is a halide anion including, but not limited to, fluoride ($F^-$), chloride ($Cl^-$), bromide ($Br^-$), and iodide ($I^-$). Examples of type I eutectics include well-studied chloroaluminate and imidazolium salt melts and less common ionic liquids formed with imidazolium salts and various metal halides. N is the number is anions.

Type II: Y is a hydrated metal halide, $MXn.mH_2O$, where M is a metal ion including, but not limited to, iron (Fe), cobalt (Co), nickel (Ni), copper (Cu), zinc (Zn), lithium (Li), sodium (Na), potassium (K), silver (Ag), cadmium (Cd), tin (Sn), aluminum (Al), gallium (Ga), indium (In), and other transition metals or rare earth metal ions); X is a halide anion including, but not limited to, fluoride ($F^-$), chloride ($Cl^-$), bromide ($Br^-$), and iodide ($I^-$); n is the number is anions and m is number of the hydrated $H_2O$.

Figure 10A:
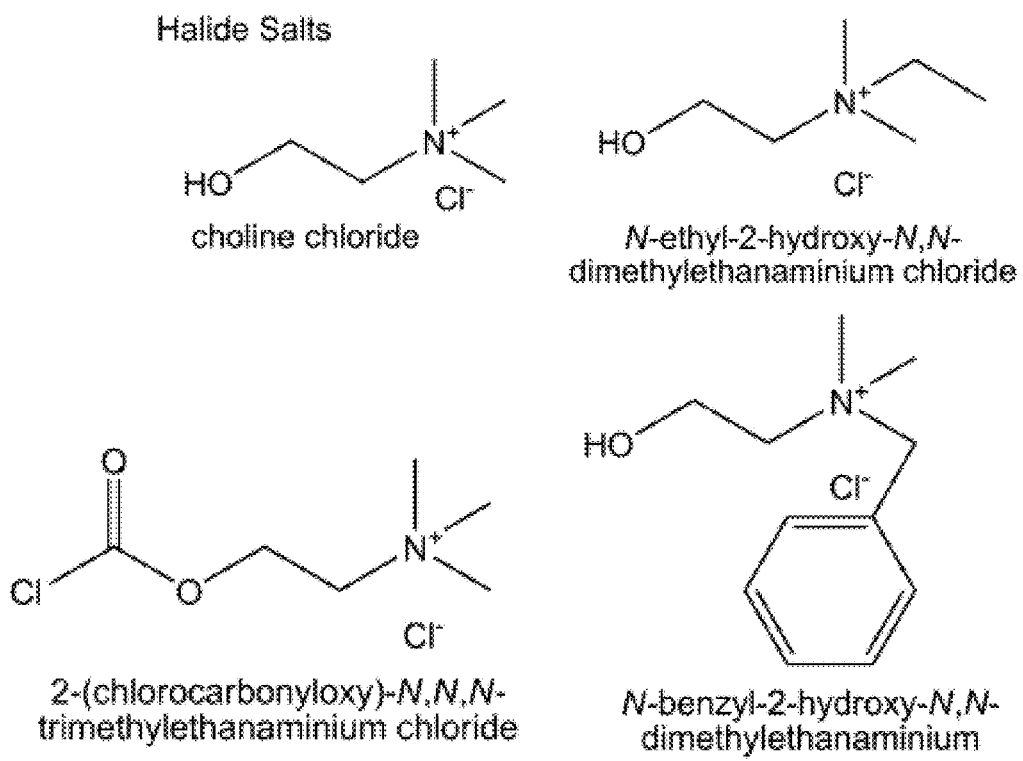
FIG. 10a depicts structures of halide salts used in the formation of deep eutectic solvents formed from hydrogen bond donors.
Figure 10B:
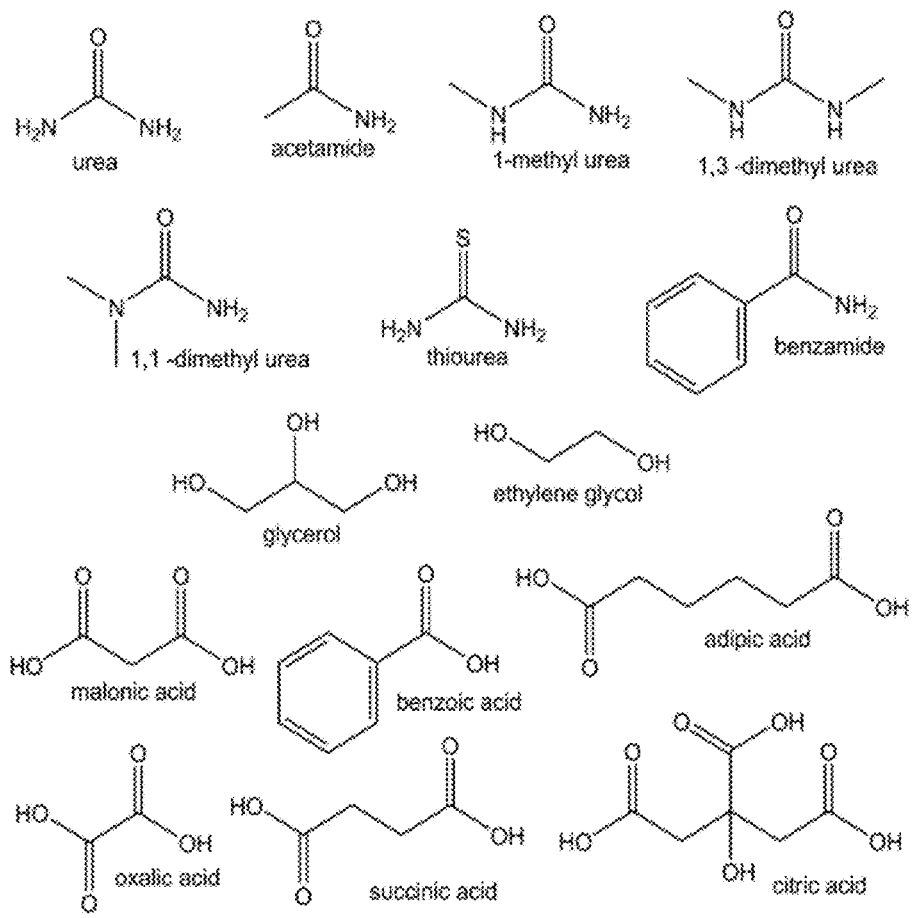
FIG. 10b depicts structures of hydrogen bond donors used in the formation of deep eutectic solvents.

Type III: Y is a hydrogen bond donor, including, but not limited to, amides, carboxylic acids, and alcohols. This class of wetting agent is particularly widely used for jamming of various particulate fillers, including, but not limited to, metal, metal oxide, metal nitride, and ceramic powders. Examples of type III DES's are formed from choline chloride and hydrogen bond donors, as shown in FIG. 10a and FIG. 10b.

Type IV: the cation of type IV DES's is typically a metal halide. Examples include mixtures of metal halides with urea, acetamide, ethylene glycol, and 1,6-hexanediol. These DES liquids are simple to prepare, and relatively unreactive with water. Further, many of these DES liquids are biodegradable and acquired at a relatively low cost. Examples of the preparation of some DES's include:

DES-1 synthesized by mixing ethylene glycol (37.2 g) with tetramethylammonium chloride (21.8 g) at 90° C. for 1 hour.

DES-2 synthesized by mixing ethylene glycol (37.2 g) with choline chloride (28.0) at 90° C. for 1 hour.

DES-3 synthesized by mixing ethylene glycol (37.2 g) and potassium iodide (16.6 g) at 90° C. for 1 hour.

Figure 11A:
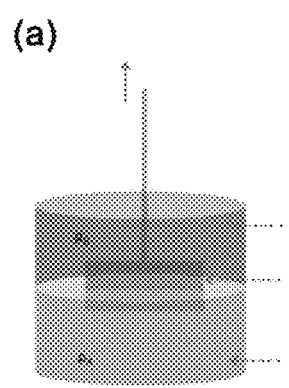
FIG. 11a depicts using the Wilhelmy plate method to measure the interfacial tension and contact angle.
Figure 11B:
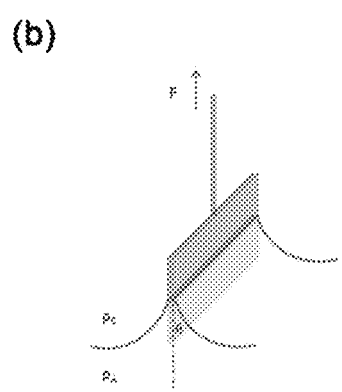
FIG. 11b depicts a contact line and a contact angle at a three phase contact line during the Wilhelmy plate experiment.

The effect of ionic liquids on the jamming of silver particles is determined by testing the wetting angle of different types of liquid in a silver-silicone oil composite. For example, the wetting angle of capillary liquids to silver particles can be tested by the Wilhelmy plate method, as shown in FIGS. 11a and 11b. While a plate is brought into contact with the liquid-liquid interface, if the probe is completely saturated by one of the liquids, the liquid will adhere to the probe and climb as a result of the capillary force, thereby increasing the interfacial area and leading to a force that pulls the probe toward the plane of the interface. This restoring force is directly related to the interfacial tension and is measured by a microbalance. The drag force ($F_D$) acting along the three-phase contact line is equal to the exact weight of the liquid meniscus standing above the plane of the fluid-fluid interface. This force, measured by the microbalance, relates to a liquid-liquid interfacial tension $\Gamma$:

$$\Gamma = \frac{F_D}{p\cos\theta}, \tag{S4}$$

where p is the perimeter of the three-phase contact line and $\theta$ is the contact angle measured for the liquid meniscus in contact with the object surface. With the known drag force ($F_D$) and interfacial tension ($\Gamma$), the wetting angle is calculated.

Experimentally, the interfacial tension between the main fluid (here silicone oil was used for demonstration) and jamming agent is determined using a commercial platinum plate. The wetting agents fully saturate or wet a platinum plate that is replaced by a metal plate fully adhered by a thin layer of silver powder, and $F_D$ is measured by the microbalance. With both measurements and the instrument under operation in a detachment mode, the interfacial tension/drag force is measured by measuring the force required to separate the plate from contact with the interface. The platinum plate is cleaned to remove organic contaminants by ethanol and then flamed before conducting an experiment.

Table S1 shows the contact angle ($\theta$) of the secondary fluid with respect to silver particles at the fluid-liquid-solid interface, which is determined by the Wilhelmy plate method. All three tested DESs have a smaller wetting angle, <50°. For ethylene glycol and DI water, the tested contact angle is much larger and consistent with the jamming testing results where only the DESs reduce the percolation threshold of a silver particle in silicone oil to approximately 5 v %.

Table S1. The wetting angle test results from the Wilhelmy plate method are shown in Table S1. $\theta$ is the wetting angle of the secondary liquid to the silver particle at the interface of the secondary liquid and silicone oil; $\Gamma$ is the interfacial tension between the secondary liquid and silicone oil; F is the capillary adhesion force determined by eq. (S1)

| Secondary liquid type | $\theta(°)$ | $\Gamma$(mN/m) | F(nN) |
|---|---|---|---|
| DES-1 | 45 | 21 | 930 |
| DES-2 | 48 | 23 | 970 |
| DES-3 | 0 | 18 | 1100 |
| Ethylene glycol | 76 | 14 | 210 |
| DI Water | 88 | 38 | 85 |

Figure 12A:
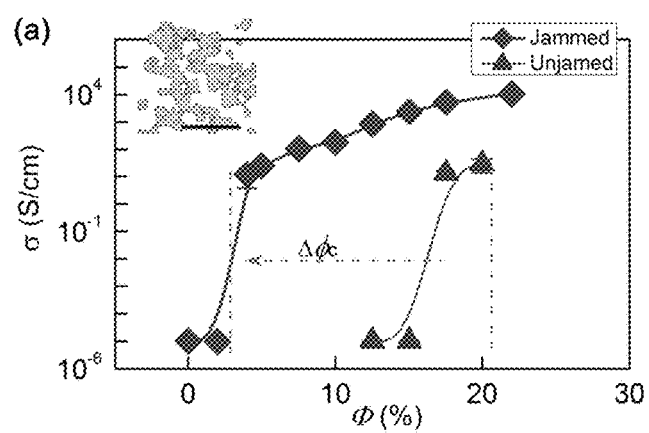
FIG. 12a depicts the electrical conductivity ($\sigma$) of the silver particle filled epoxy composites as a function of $\Phi$.

The optical microscopic images of the silver filled epoxy resin after capillary jamming treatment demonstrates a fractal structure with a dimension of approximately 100 μm, as shown by the inset of FIG. 12a, indicating that the jammed network is maintained in the cured epoxy resin. Additionally, the out-of-plane conductivity of a bulk silver-epoxy sample is probed. The out-of-plane AC conductivity is also percolated at an ultra-low percolation threshold of 3 v % through jamming gelation, indicating that the jamming gelation network within the composite is a three-dimensional percolating conductive.

Figure 12B:
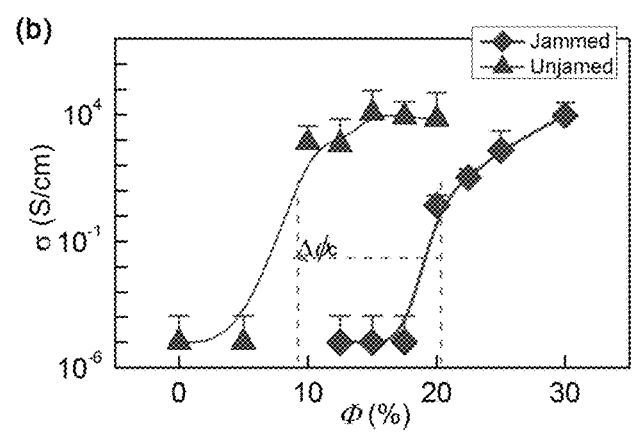
FIG. 12b depicts the electrical conductivity of the silver particle filled PMMA as a function of $\Phi$.

In FIG. 12b, the percolation behavior of the silver particle filled thermoplastics matrix including poly(methylmethacrylate) (PMMA) is demonstrated and controlled by jamming gelation. In order to make the PMMA based conductive ink, PMMA is first dissolved in a solvent, such as chlorobenzene, and then mixed with silver particles to form a suspension. The electrical conductivity of the PMMA based conductive ink filled with different filler volume fractions of silver particles can be measured using the four-point probe method. As shown in FIG. 12b, the percolation threshold of the silver filled PMMA composite without and with SILs is compared. Similarly, the percolation threshold decreases from approximately 20 v % to approximately 10 v % due to the jamming gelation treatment. The dramatic decrease of the percolation threshold, as shown in FIG. 11b, demonstrates the versatility of jamming gelation on electrical percolation control.

The jamming gelation percolation provides unprecedented electrically conductive properties of the polymer composite. The jamming gelation percolating conductivity with an ultra-low volume fraction is comparable to the conductivity of an unjammed composite with a very high filler loading. For example, the electrical conductivity of a jammed epoxy composite with approximately 4 v % of silver particles is approximately 10 S/cm which is the same electrical conductivity compared to the unjammed composite with 20 v % silver filler. Additionally, the electrical conductivity of jammed silver-PMMA composites with a 10 v % silver particle is approximately 810 S/cm which is much higher than the unjammed silver-PMMA composite with 25v % silver particles at approximately 400 S/cm. Additionally, even above the conventional percolation threshold of 20 v %, the jammed conductive composite has a conductivity typically more than 3 orders of magnitude higher than the unjammed composite. For instance, the jammed silver-PMMA has a conductivity of 6700 S/cm with a loading of 20 v %, which is greater than 2000 times the conductivity of unjammed silver-PMMA with a conductivity of approximately 3 S/cm. Similarly, the same trend occurs with a silver-epoxy system, as shown in FIG. 11a, proving that jamming gelation is powerful in producing highly electrically conductive composites.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An electrical and thermal conductive composite comprising:
    a base material configured to form a matrix and mixed with conductive particulate fillers, thereby forming a polymeric suspension;
    a conduction promoter configured to saturate a filler surface, wherein the conduction promoter is an immiscible wetting agent having an ultra-low particle filler volume fraction;
    capillary bridges configured between the conductive particulate fillers; and
    a conductive network including a percolated polymeric suspension and the capillary bridges.

2. The electrical and thermal conductive composite of claim 1, further comprising auxiliary components mixed with the base material and the conductive particulate fillers.

3. The electrical and thermal conductive composite of claim 2,
    wherein the auxiliary components are selected from any type of liquid or powder and are configured as a functional additive to the electrical and thermal conductive composite, and
    wherein the functional additive is selected from at least one of an organic solvent configured as a diluent, a prepolymer compound configured as a thickening agent, an inorganic nanoparticle configured as a thixotropic agent, a curing agent, and a catalyst.

4. The electrical and thermal conductive composite of claim 1, wherein the base material is selected from at least one of polymers, biomacromolecular materials, organic-inorganic sol-gels, metals, metal oxide, ceramics and/or precursors or derivatives of polymers, biomacromolecular materials, organic-inorganic sol-gels, metals, metal oxide, and ceramics.

5. The electrical and thermal conductive composite of claim 4,
wherein the base material further comprises polymer materials, and
wherein the polymer materials are selected from at least one of polymer solutions or polymer suspensions, thermo-plastics, thermo-setting resins, rubbers, elastomers, polymer gels, hydrogels, organogels, or other types of macromolecular based materials or derivatives of polymer solutions or polymer suspensions, thermo-plastics, thermo-setting resins, rubbers, elastomers, polymer gels, hydrogels, organogels, and types of macromolecular based materials.

6. The electrical and thermal conductive composite of claim 1,
wherein the conductive particulate fillers are selected from at least one of metal, non-metal, metal oxide, ceramic powders or a derivative form of metal, non-metal, metal oxide, and ceramic powders, and
wherein each conductive particulate filler particle size is tens of a nanometer to a few millimeters.

7. The electrical and thermal conductive composite of claim 1, wherein the conduction promoter is selected from at least one of water, organic compounds, metallorganic compounds, ionic liquids, and deep eutectic solvents and/or a mixture of water, organic compounds, metallorganic compounds, ionic liquids, and deep eutectic solvents.

8. The electrical and thermal conductive composite of claim 1, wherein the conduction promoter is a precursor and generates immiscible wetting agents during processing or under processing conditions.

9. The electrical and thermal conductive composite of claim 1, wherein a content of the conduction promoter is within a range of 0.1 wt % to 20 wt % of a polymer matrix.

10. The electrical and thermal conductive composite of claim 1, wherein the conduction promoter contains additional functional materials selected from a nanoparticle of a metal, metal oxides or ceramics, and carbon-based materials including a carbon tube, graphene, and graphene oxide.

11. The electrical and thermal conductive composite of claim 1, wherein the immiscible wetting agent is selected from a liquid form or a solid form that melts under a processing condition.

12. The electrical and thermal conductive composite of claim 1, wherein the immiscible wetting agent is selected from any inorganic or organic compound that wets the filler surface.

13. The electrical and thermal conductive composite of claim 1, wherein the immiscible wetting agent is selected from any inorganic or organic compound that wets the filler surface in the matrix of the base material.

14. The electrical and thermal conductive composite of claim 1, wherein an electrical conductivity and a thermal conductivity of the electrical and thermal conductive composite remains at a same thermal conductivity value as a conventional commercial product with a reduction of silver content by up to 50 wt %.

15. A method for producing an electrical and thermal conductive composite comprising:
mixing a base material with conductive particulate fillers, wherein the base material forms a matrix;
forming a polymeric suspension including a mixture of the base material and the conductive particulate fillers;
saturating a filler surface with a conduction promoter having an ultra-low particle filler volume fraction, wherein the conduction promoter is an immiscible wetting agent;
exerting capillary forces from the immiscible wetting agent upon the polymeric suspension;
inducing capillary bridging between the conductive particulate fillers; and
forming a conductive network including a percolated polymeric suspension and the induced capillary bridging.

16. The method for producing an electrical and thermal conductive composite of claim 15, further comprising mixing auxiliary components with the base material and the conductive particulate fillers.

17. The method for producing an electrical and thermal conductive composite of claim 16,
wherein the auxiliary components are selected from any type of liquid or powder and are configured as a functional additive to the electrical and thermal conductive composite, and
wherein the functional additive is selected from an organic solvent configured as a diluent, a prepolymer compound configured as a thickening agent, an inorganic nanoparticle configured as a thixotropic agent, a curing agent, and a catalyst.

18. The method for producing an electrical and thermal conductive composite of claim 15, wherein the base material is selected from at least one of polymers, biomacromolecular materials, organic-inorganic sol-gels, metals, metal oxide, ceramics and/or precursors or derivatives of polymers, biomacromolecular materials, organic-inorganic sol-gels, metals, metal oxide, and ceramics.

19. The method for producing an electrical and thermal conductive composite of claim 18,
wherein the base material further comprises polymer materials, and
wherein the polymer materials include at least one of polymer solutions or polymer suspensions, thermo-plastics, thermo-setting resins, rubbers, elastomers, polymer gels, hydrogels, organogels, or other types of macromolecular based materials or derivatives of polymer solutions or polymer suspensions, thermo-plastics, thermo-setting resins, rubbers, elastomers, polymer gels, hydrogels, organogels, or other types of macromolecular based materials.

20. The method for producing an electrical and thermal conductive composite of claim 15,
wherein the conductive particulate fillers are selected from at least one of metal, non-metal, metal oxide, ceramic powders or a derivative form of metal, non-metal, metal oxide, and ceramic powders, and
wherein each conductive particulate filler particle size is tens of a nanometer to a few millimeters.

21. The method for producing an electrical and thermal conductive composite of claim 15, wherein the conduction promoter is selected from at least one of water, organic compounds, metallorganic compounds, ionic liquids, and deep eutectic solvents and/or a mixture of water, organic compounds, metallorganic compounds, ionic liquids, and deep eutectic solvents.

22. The method for producing an electrical and thermal conductive composite of claim 15, wherein the conduction promoter is a precursor and generates immiscible wetting agents during processing or under processing conditions.

23. The method for producing an electrical and thermal conductive composite of claim 15, wherein a content of the conduction promoter is within a range of 0.1 wt % to 20 wt % of a polymer matrix.

24. The method for producing an electrical and thermal conductive composite of claim 15, wherein the conduction promoter contains additional functional materials selected from at least one of a nanoparticle of a metal, metal oxides or ceramics, and carbon-based materials including a carbon tube, graphene, and graphene oxide.

25. The method for producing an electrical and thermal conductive composite of claim 15, wherein the immiscible wetting agent is selected from a liquid form or a solid form that melts under a processing condition.

26. The method for producing an electrical and thermal conductive composite of claim 15, wherein the immiscible wetting agent is selected from any inorganic or organic compound that wets the filler surface.

27. The method for producing an electrical and thermal conductive composite of claim 15, wherein the immiscible wetting agent is selected from any inorganic or organic compound that wets the filler surface in the matrix of the base material.

28. The method for producing an electrical and thermal conductive composite of claim 15, wherein an electrical conductivity and a thermal conductivity of the electrical and thermal conductive composite remains at a same thermal conductivity value as a conventional commercial product with a reduction of silver content by up to 50 wt %.

\* \* \* \* \*